(12) United States Patent
Hong

(10) Patent No.: US 12,414,175 B2
(45) Date of Patent: Sep. 9, 2025

(54) METHOD AND APPARATUS FOR INDICATING DATA TRANSMISSION, COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 435 days.

(21) Appl. No.: 17/791,671

(22) PCT Filed: Jan. 10, 2020

(86) PCT No.: PCT/CN2020/071517
§ 371 (c)(1),
(2) Date: Jul. 8, 2022

(87) PCT Pub. No.: WO2021/138914
PCT Pub. Date: Jul. 15, 2021

(65) Prior Publication Data
US 2023/0032301 A1    Feb. 2, 2023

(51) Int. Cl.
*H04W 76/15* (2018.01)
*H04L 5/00* (2006.01)

(52) U.S. Cl.
CPC .......... *H04W 76/15* (2018.02); *H04L 5/0055* (2013.01)

(58) Field of Classification Search
CPC ..... H04W 72/12; H04W 72/04; H04W 76/15; H04L 5/0055; H04L 5/0094
See application file for complete search history.

(56) References Cited

U.S. PATENT DOCUMENTS

| 8,982,930 B2 * | 3/2015 | Kimura | H04W 56/0045 |
| | | | 710/1 |
| 2008/0316989 A1 * | 12/2008 | Balogh | H04W 48/18 |
| | | | 370/338 |

(Continued)

FOREIGN PATENT DOCUMENTS

| CN | 103298064 A | 9/2013 |
| CN | 105071906 A | 11/2015 |

(Continued)

OTHER PUBLICATIONS

BlackBerry UK Limited, "UL Transmit Power Control for Dual Connectivity", 3GPP TSG RAN WG1 Meeting #77,R1-142355,Seoul, Korea, May 19-23, 2014.

(Continued)

*Primary Examiner* — Raj Jain
(74) *Attorney, Agent, or Firm* — Volpe Koenig

(57) ABSTRACT

A method for indicating data transmission under more than one connection, performed by an access point and including: receiving, in a first connection, a first data frame sent by a first station; generating, according to a transmission status of a second data frame between the access point and a second station in a second connection, an acknowledgement message frame containing time information for the first data frame, the time information being configured to indicate time at which the first station re-accesses the first connection after receiving the acknowledgement message frame, and the second connection being different from the first connection; and sending the acknowledgement message frame in the first connection.

17 Claims, 7 Drawing Sheets

(56) References Cited

U.S. PATENT DOCUMENTS

| | | | |
|---|---|---|---|
| 2012/0230317 A1 | 9/2012 | Kim et al. | |
| 2013/0171975 A1* | 7/2013 | Lindner | H04N 21/41407 |
| | | | 455/412.1 |
| 2015/0312957 A1 | 10/2015 | Pelletier et al. | |
| 2016/0088602 A1 | 3/2016 | Seok | |
| 2017/0086212 A1* | 3/2017 | Kim | H04L 27/2602 |
| 2017/0127408 A1 | 5/2017 | Du | |
| 2017/0311143 A1* | 10/2017 | Yamaura | H04W 8/00 |
| 2018/0124612 A1 | 5/2018 | Babaei et al. | |
| 2019/0021055 A1 | 1/2019 | Guo et al. | |
| 2019/0089519 A1* | 3/2019 | Nabetani | H04W 72/12 |
| 2023/0032301 A1* | 2/2023 | Hong | H04L 5/0094 |

FOREIGN PATENT DOCUMENTS

| | | |
|---|---|---|
| CN | 105848298 A | 8/2016 |
| CN | 106211335 A | 12/2016 |
| CN | 106559903 A | 4/2017 |
| CN | 109041179 A | 12/2018 |
| CN | 109315006 A | 2/2019 |
| CN | 109315008 A | 2/2019 |
| CN | 110048758 A | 7/2019 |
| WO | 2017054492 A1 | 4/2017 |
| WO | 2017/143856 A1 | 8/2017 |
| WO | 2017133314 A1 | 8/2017 |

OTHER PUBLICATIONS

Sunghyun Hwang, Consideration on Multi-link Operation, IEEE802.11-19/1181R1 (2019).

* cited by examiner

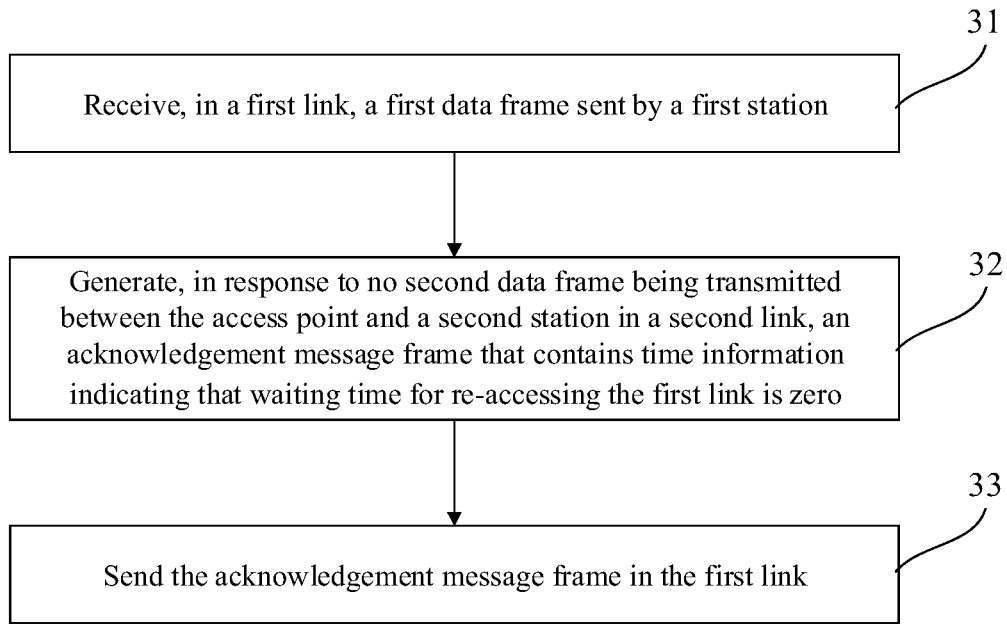
Fig. 3
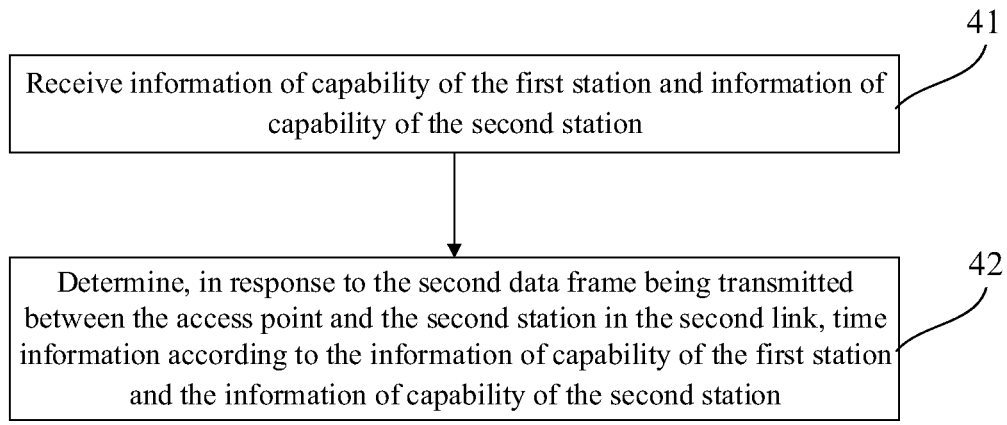
Fig. 4a
| Information element bit | Length bit | Length bit |
Fig. 4b

METHOD AND APPARATUS FOR INDICATING DATA TRANSMISSION, COMMUNICATION DEVICE AND STORAGE MEDIUM

CROSS-REFERENCE TO RELATED APPLICATION

The present application is a National Stage of International Application No. PCT/CN2020/071517, filed on Jan. 10, 2020, the contents of which are incorporated by reference herein in their entireties for all purposes.

BACKGROUND

In recent years, Wireless Fidelity (Wi-Fi) has become a research focus. The research on Wi-Fi covers 320 MHz-bandwidth transmission, multi-frequency-band aggregation and coordination, etc. Targeted at increase in speed and throughput, decrease in latency, etc., Wi-Fi is principally applied to video transmission, augmented reality, virtual reality, etc. Multi-frequency-band or multi-link aggregation refers to devices sending data under more than one frequency band (2.4 GHZ, 5 GHz and 6 GHz-7 GHz) or multi-links. In this way, the throughput of the entire system is improved by sending data having different contents in each frequency band, and the success rate of sending or receiving data is improved by sending data having the same content in each link.

SUMMARY

Examples of the disclosure provide a method and apparatus for indicating data transmission under multi-links, a communication device and a storage medium.

According to a first aspect of an example of the disclosure, there is provided a method for indicating data transmission under multi-links. The method is performed by an access point and includes:
receiving, in a first link, a first data frame sent by a first station;
generating, according to a transmission status of a second data frame between the access point and a second station in a second link, an acknowledgement message frame containing time information for the first data frame, the time information being configured to indicate time at which the first station re-accesses the first link after the first station receives the acknowledgement message frame, and the second link being different from the first link; and sending the acknowledgement message frame in the first link.

According to a second aspect of an example of the disclosure, there is further provided a method for indicating data transmission. The method is performed by a first station and includes:
sending a first data frame in a first link;
receiving an acknowledgement message frame for the first data frame in the first link, the acknowledgement message frame containing time information, and the time information being configured to indicate time at which the first station accesses the first link after the first station receives the acknowledgement message frame; and
accessing the first link according to the time information.

According to a third aspect of an example of the disclosure, there is further provided an apparatus for indicating data transmission under multi-links. The apparatus is applied to an access point and includes a first receiving module, a generating module and a first sending module.

The first receiving module is configured to receive a first data frame sent by a first station in a first link.

The generating module is configured to generate, according to a transmission status of a second data frame between the access point and a second station in a second link, an acknowledgement message frame containing time information for the first data frame. The time information is configured to indicate time at which the first station re-accesses the first link after receiving the acknowledgement message frame, and the second link is different from the first link.

Further, the first sending module is configured to send the acknowledgement message frame in the first link.

According to a fourth aspect of an example of the disclosure, there is further provided an apparatus for indicating data transmission. The apparatus is applied to a first station and includes a second sending module, a second receiving module and an access module.

The second sending module is configured to send a first data frame in a first link.

The second receiving module is configured to receive an acknowledgement message frame for the first data frame in the first link. The acknowledgement message frame contains time information, and the time information is configured to indicate time at which the first station accesses the first link after the first station receives the acknowledgement message frame.

Further, the access module is configured to access the first link according to the time information.

According to a fifth aspect of an example of the disclosure, there is provided a communication device, including an antenna, a memory, and a processor. The processor is connected to the antenna and the memory respectively, and the processor is configured to control, by executing an executable program stored in the memory, the antenna to receive and send wireless signals, and configured to execute the steps of the method according to any one of the above technical solutions.

According to a sixth aspect of an example of the disclosure, there is provided a non-transitory computer-readable storage medium. The non-transitory computer-readable storage medium stores an executable program, the executable program implementing the steps of the method according to any one of the above technical solutions when being executed by a processor.

BRIEF DESCRIPTION OF THE DRAWINGS

FIG. 3 is a schematic diagram of a method for indicating data transmission under multi-links according to another example of the disclosure.

FIG. 4a is a schematic diagram of a method for indicating data transmission under multi-links according to yet another example of the disclosure.

FIG. 4b is a schematic diagram of a format for an information sending according to an example of the disclosure.

DETAILED DESCRIPTION

The examples will be described in detail and shown in the accompanying drawings. When the following descriptions relate to the accompanying drawings, unless otherwise specified, the same numeral in different accompanying drawings denotes the same or similar element. The implementations described in the following examples do not denote all implementations consistent with examples of the disclosure. On the contrary, the implementations are merely examples of an apparatus and a method consistent with some aspects of the examples of the disclosure as detailed in the appended claims.

The terms used in examples of the disclosure are merely to describe the specific examples, instead of limiting the examples of the disclosure. The singular forms such as "a/an" and "this" used in the examples of the disclosure and the appended claims are also intended to include the plural forms, unless otherwise clearly stated in the context. It should also be understood that the term "and/or" refers to and contains any or all possible combinations of one or more of the associated listed items.

It should be understood that although the terms "first", "second", "third", etc. may be employed in examples of the disclosure to describe various information, such information should not be limited to these terms. These terms are used to distinguish the same type of information from each other. For example, first information could also be referred to as second information, and similarly, second information could also be referred to as first information, without departing from the scope of the examples of the disclosure. Depending on the context, the word "if" may be interpreted as "in the case of", "under the condition that" or "in response to determining". In order to further improve the throughput of the system, there may be devices supporting simultaneous sending and receiving, devices supporting multi-link sending or receiving, and devices supporting single-link receiving or sending in a wireless system. However, different kinds of devices may interfere with one another when transmitting data.

In order to better describe any one of the examples of the disclosure, an application scenario of wireless data transmission is taken as an example for illustration in an example of the disclosure.

Figure 1:
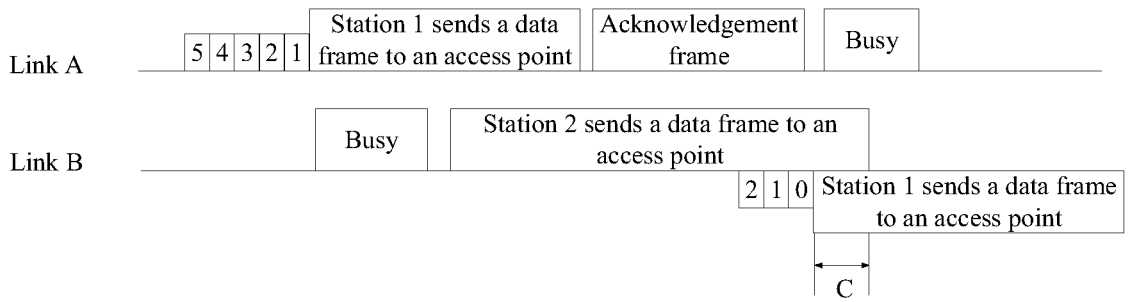
FIG. 1 is an application scenario of wireless data transmission according to an example of the disclosure.

As shown in FIG. 1, there is provided an application scenario of wireless data transmission according to an example of the disclosure. In this application scenario, a wireless system includes an access point, a station 1 and a station 2. The access point is a device supporting multi-link simultaneous sending and receiving, the station 1 is a device supporting multi-link sending or receiving, and the station 2 is a device supporting single-link sending or receiving. Under the condition that the station 2 sends data to the access point in a link B during the period when the station 1 sends data to the access point and receives an acknowledgement frame fed back by the access point in a link A, since the station 1 is a device that does not support simultaneous sending and receiving and the station 2 is a device that supports single-link sending or receiving, the station 1 may cause communication interference to the station 2 (with reference to time period indicated by C in FIG. 1), resulting in failure in data transmission and waste of transmission resources.

Figure 2:
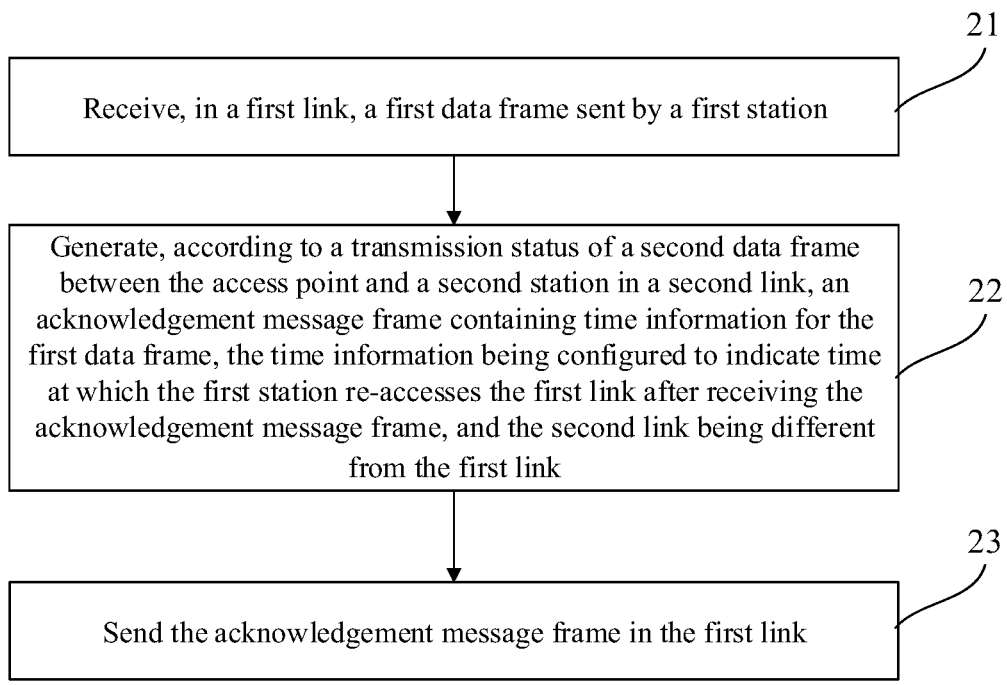
FIG. 2 is a schematic diagram of a method for indicating data transmission under multi-links according to an example of the disclosure.

FIG. 2 shows a method for indicating data transmission under multi-links according to an example of the disclosure. With reference to FIG. 2, the method includes steps 21-23.

Step 21 includes receiving, in a first link, a first data frame sent by a first station.

The multi-links refers to more than one bandwidth in one frequency band. The frequency band may be 2.4 GHz, 5 GHz or 6 GHZ-7 GHz. The bandwidth refers to a bandwidth of a frequency spectrum operating in the frequency band, for example, 20 MHz and 40 MHz, etc. One link may correspond to one bandwidth. In some examples, the multi-links may be links in basic service set (BSS) composed of the same channel bandwidth in the same frequency band or different channel bandwidths in the same frequency band; and alternatively, may be links in the BSS composed of the same or different channel bandwidths in different frequency bands.

The multi-links may be understood as more than one channel for transmitting data. For example, each link in the multi-links corresponds to one channel for transmitting data. In a wireless communication system, there may be multi-links between a station and an access point, for example, a first link and a second link, etc. A station that only supports a single link may only receive or send data in a single link, for example, receive data in the first link or send data in the first link. A station that supports multi-links may send or receive data in multi-links, for example: send data in both the first link and the second link simultaneously; send data in the first link, and receive data in the second link simultaneously; and receive data in the first link and in the second link simultaneously. The first station may be a station that supports multi-link sending and receiving; and the first station may also be a station that supports multi-link sending and receiving.

A service area in which the access point is located may include more than one station. Taking a smart meter wireless system as an example, the access point may be a base station, a routing device, etc. in the smart meter wireless system. The first station may be a smart meter, etc. in the smart meter wireless system. A distance between the first station and the access point is within a coverage range of the access point, so as to ensure that the first station may receive a message frame sent by the access point.

Step 22 includes generating, according to a transmission status of a second data frame between the access point and a second station in a second link, an acknowledgement message frame containing time information for the first data frame, and the time information being configured to indicate time at which the first station re-accesses the first link after the first station receives the acknowledgement message frame. Additionally, the second link is different from the first link.

In an example, the second station may be a device that supports single-link sending or receiving.

The first station and the second station may be any communication device capable of accessing the access point, including but not limited to: mobile phones, smart home devices and/or smart office devices.

In an example, the time information may contain information of starting time, information of ending time, or information of waiting time for the first station to re-access the first link. For example, the time information may indicate that the starting time for the first station to re-access the first link is 10:01:01 to 10:01:02, where the "10:01:01" being the starting time, and the "10:01:02" being the ending time.

In an example, the time information may be information of waiting time for the first station to access the first link after receiving the acknowledgement message frame. For example, the time information may be information of waiting time of 2 ms for the first station to access the first link after receiving the acknowledgement message frame.

In another example, the time information may be information of time at which the first station accesses the first link after receiving the acknowledgement message frame. For example, the time information may be information of time of 10:00:10 at which the first station accesses the first link after receiving the acknowledgement message frame. In an example of the disclosure, since the first data frame is sent in the first link, re-accessing the first link means that the first station re-accesses the first link after sending the first data frame and receiving the acknowledgement message frame. After the first station re-accesses the first link, the first station and the access point may transmit data mutually in the first link.

The transmission status may be that no data is transmitted between the access point and the second station in the second link; and alternatively, may be that the second data frame is transmitted between the access point and the second station in the second link. Under the condition that the second data frame is transmitted between the access point and the second station in the second link, the access point may send data to the second station, and alternatively the access point may receive data sent by the second station.

Finally, Step 23 includes sending the acknowledgement message frame in the first link.

In an example, the acknowledgement message frame may be a transmission-type control character sent by the access point to the first station, and may be configured to indicate that the received data has been confirmed to be received or failed to be received. For example, under the condition that the acknowledgement message frame carries acknowledgement (ACK), it is indicated that the access point successfully receives the first message frame; and under the condition that the acknowledgement message frame carries negative acknowledgement (NACK), it is indicated that the access point fails to receive the first message frame.

In an example, after receiving the first data frame sent by the first station each time, the access point feeds back to the first station an acknowledgement message frame indicating whether the first data frame is successfully received.

In the example, the acknowledgement message frame for the first data frame contains the time information, the first station may re-access the first link after receiving the acknowledgement message frame according to an indication of the time information. Since the time information is generated according to the transmission status of the second data frame between the access point and the second station in the second link, the transmission status of the second data frame in the second link is reflected. Compared with accessing the first link randomly, the first station accesses the first link based on the time information, so that interference to transmission of the second data frame between the access point and the second station in the second link may be reduced.

FIG. 3 shows a method for indicating data transmission under multi-links according to another example of the disclosure. With reference to FIG. 2, steps 21 and 23 are equivalent to steps 31 and 33 of FIG. 3 respectively and will not be re-described. With reference to FIG. 2, in step 22, the step of generating, according to a transmission status of a second data frame between the access point and a second station in a second link, an acknowledgement message frame containing time information for the first data frame instead is replaced with Step 32 of FIG. 3.

Step 32 includes generating, in response to no second data frame being transmitted between the access point and the second station in the second link, the acknowledgement message frame that contains the time information indicating that waiting time for re-accessing the first link is zero.

Since no second data frame is transmitted between the access point and the second station in the second link, the first station accessing the first link will not cause interference. The first station may immediately access the first link after receiving the acknowledgement message frame that contains the time information indicating that the waiting time for re-accessing the first link is zero, so as to improve efficiency of data transmission under multi-links. Under the condition that the waiting time is zero, after receiving the acknowledgement message frame, the first station may understand to re-access the first link, and transmit data with the access point in the first link.

FIG. 4a shows a method for indicating data transmission under multi-links according to yet another example of the disclosure. With reference to FIG. 4a, the method includes steps 41 and 42.

Step 41 includes receiving information of capability of the first station and information of capability of the second station.

The information of capability is information describing a communication capability of any one of the stations, for example, information describing whether a station supports multi-link receiving and sending or only supports single-link receiving and sending. For another example, under the condition that the information of capability is information describing a station supports multi-link receiving and sending, the information of capability is information describing whether a station only supports multi-link sending or multi-link receiving or simultaneously supports multi-link sending and receiving.

The information of capability may be information of capability supporting multi-link simultaneous sending or receiving, may be information of capability supporting multi-link sending or receiving, and may be information of capability supporting single-link sending or receiving.

In an example, the first station and the second station may send the information of capability to the access point in the process of establishing connection with the access point. For example, the first station and the second station may send, after entering a service range of the access point, the information of capability to the access point in the process of establishing connection with the access point for the first time.

In an example, the information of capability of the first station and the information of capability of the second station are carried in any one of the following message frames: a probe request frame, an association request frame and an authentication request frame.

It should be noted that, the access point may also send the information of capability of the access point to at least one of the first station and the second station in a beacon frame, a probe request frame or an association request frame.

In an example, the information of capability includes one of the following: a first value indicating that a corresponding station supports multi-link sending and receiving; a second value indicating that a corresponding station supports multi-link sending or multi-link receiving; and a third value indicating that a corresponding station supports single-link sending or single-link receiving.

With reference to FIG. 4b, the information of capability may be identified by information fields in the probe request frame, the association request frame, the authentication request frame, etc. The information field may include an information element bit field (Element ID), a length bit field (Length) and an information bit field (Information). The information bit field may occupy one byte. The information element bit field may be configured to identify an information of station identity. For example, the information element bit field includes three bits, with "001" to identify the first station and "010" to identify the second station. The information bit field may be configured to identify the information of capability of the stations. The stations include the first station and the second station.

In an example, the information bit field identifies the information of capability of the stations by means of two bits. For example, in response to the value of the two bits being "00", it is indicated that the station only supports single-link sending or single-link receiving; in response to the value of the two bits being "01", it is indicated that the station supports multi-link sending or multi-link receiving; and in response to the value of the two bits being "10", it is indicated that the station supports multi-link sending and receiving. It should be noted that the number of bits for identifying the information of capability of the stations may be adjusted according to the number of the information of capability contained in a station device. For example, under the condition that more than four types of information of capability are contained in the station device, three bits are required for identification.

Referring back to FIG. 4a, Step 42 includes determining, in response to the second data frame being transmitted between the access point and the second station in the second link, the time information according to the information of capability of the first station and the information of capability of the second station.

In an example, the time information includes information of waiting time for the first station to access the first link after receiving the acknowledgement message frame. The information of waiting time may be information containing a time period. For example, the information of waiting time may be information containing a time period of 2 ms. That is, after receiving the acknowledgement message frame, the first station may access the first link after waiting for 2 ms.

Figure 5:
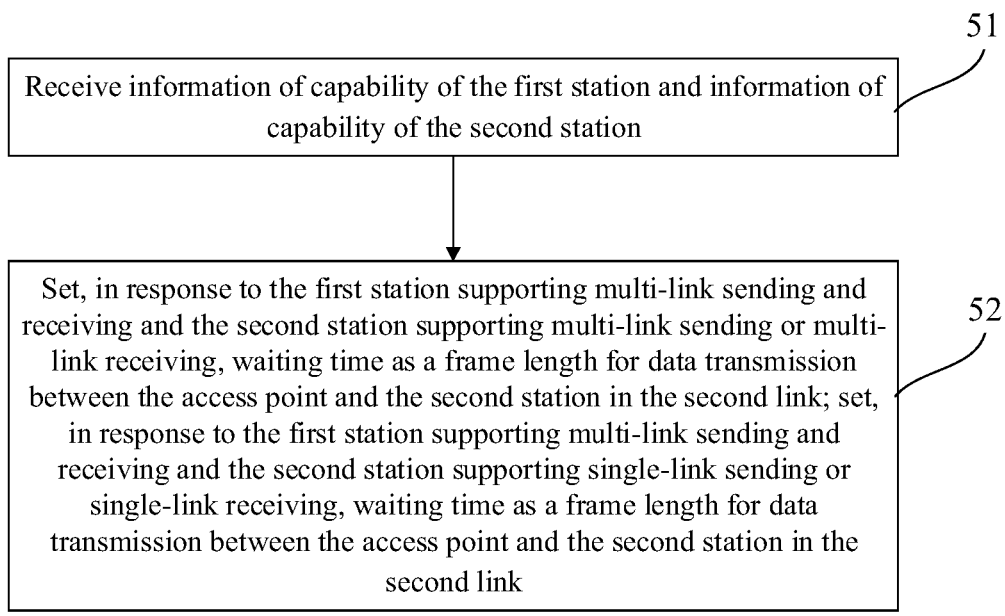
FIG. 5 is a schematic diagram of a method for indicating data transmission under multi-links according to yet another example of the disclosure.

FIG. 5 shows a method for indicating data transmission under multi-links according to another example of the disclosure. Step 51 of FIG. 5 is equivalent to step 41 of FIG. 4a and is not re-described here. With reference to FIG. 4a, in step 42, the step of determining the time information according to the information of capability of the first station and the information of capability of the second station is instead replaced with step 52 of FIG. 5.

Step 52 includes setting, in response to the first station supporting multi-link sending and receiving and the second station supporting multi-link sending or multi-link receiving, the waiting time as a frame length for data transmission between the access point and the second station in the second link; and alternatively, setting, in response to the first station supporting multi-link sending and receiving and the second station supporting single-link sending or single-link receiving, the waiting time as a frame length for data transmission between the access point and the second station in the second link.

Under the condition that the first station supports multi-link sending and receiving and the second station supports multi-link sending or multi-link receiving, and alternatively, under the condition that the first station supports multi-link sending and receiving and the second station supports single-link sending or single-link receiving, the first station accessing the first link will cause interference to data transmission between the access point and the second station in the second link. The waiting time is set as the frame length for data transmission between the access point and the second station in the second link, such that the first station may re-access the first link after avoiding time period during which the access point transmits data with the second station in the second link, and interference to data transmission between the access point and the second station in the second link is reduced.

Figure 6:
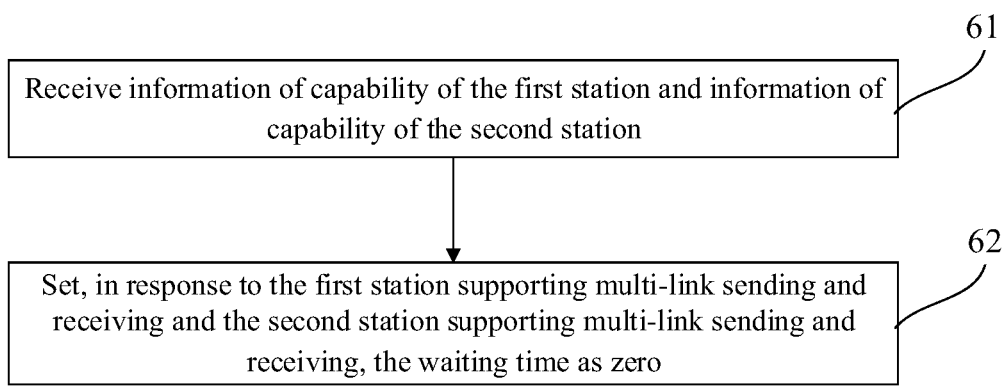
FIG. 6 is a schematic diagram of a method for indicating data transmission under multi-links according to yet another example of the disclosure.

FIG. 6 shows a method for indicating data transmission under multi-links according to another example of the disclosure. Step 61 of FIG. 6 is equivalent to step 41 of FIG. 4a and is not re-described here. With reference to FIG. 4, in step 42, the step of determining the time information according to the information of capability of the first station and the information of capability of the second station is instead replaced with step 62 of FIG. 6.

Step 62 includes setting, in response to the first station supporting multi-link sending and receiving and the second station supporting multi-link sending and receiving, the waiting time as zero.

Since the first station supports multi-link sending and receiving and the second station supports multi-link sending and receiving, transmission of the first data frame by the first station in the first link does not interfere with transmission of the data frame by the second station in the second link, and the first station may directly access the first link without waiting.

In an example, transmission of the second data frame between the access point and the second station in the second link includes at least one of: receiving the second data frame sent by the second station in the second link; and alternatively, sending the second data frame to the second station in the second link.

In an example, a basic service set identifier (BSSID) carried in the first data frame is the same as a BSSID carried in the second data frame; and alternatively, a basic service set (BSS) color carried in the first data frame is the same as a BSS color carried in the second data frame.

The BSSID carried in the first data frame is the same as the BSSID carried in the second data frame, such that the first station for sending the first data frame and the second station for sending the second data frame belong to the same network.

In an example, the BSS color carried in the first data frame is the same as the BSS color carried in the second data frame. The BSS color is an identification of an intra-physical layer protocol data unit (intra-PPDU) in the BSS. The BSS color is configured to identify that the physical layer protocol data units belong to the same BSS.

Figure 7:
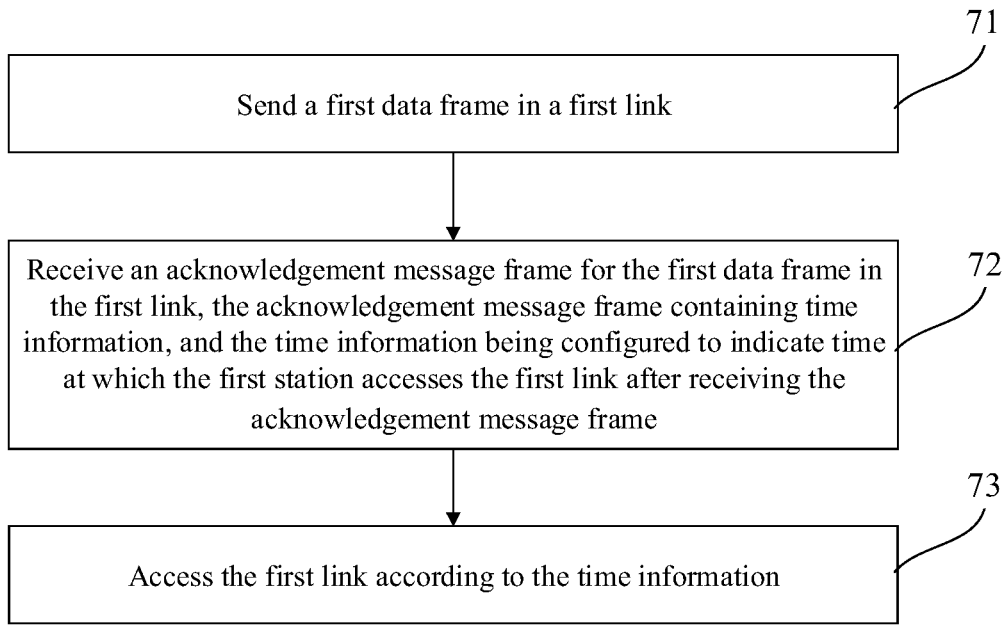
FIG. 7 is a schematic diagram of a method for indicating data transmission under multi-links according to yet another example of the disclosure.

FIG. 7 shows a method for indicating data transmission under multi-links according to another example of the disclosure. The method is performed by a first station, and with reference to FIG. 7, the method includes steps 71-73.

Step 71 includes sending a first data frame in a first link.

The multi-links refers to more than one bandwidth in one frequency band. The frequency band may be 2.4 GHZ, 5 GHz or 6 GHZ-7 GHZ. The bandwidth refers to a bandwidth of a frequency spectrum operating in the frequency band, for example, 20 MHz and 40 MHz etc. One link may correspond to one bandwidth. In some examples, the multi-links may be links in basic service set (BSS) composed of the same channel bandwidth in the same frequency band or different channel bandwidths in the same frequency band; and alternatively, may be links in the BSS composed of the same or different channel bandwidths in different frequency bands. The multi-links may be understood as more than one channel for transmitting data. For example, each link in the multi-links corresponds to one channel for transmitting data. In a wireless communication system, there may be multi-links between a station and an access point, for example, a first link and a second link, etc. A station that only supports a single link may only receive or send data in a single link, for example, receive data in the first link or send data in the first link. A station that supports multi-links may send or receive data in multi-links, for example: send data in both the first link and the second link simultaneously; send data in the first link, and receive data in the second link simultaneously; and receive data in the first link and in the second link simultaneously. The first station may be a station that supports multi-link sending and receiving; and the first station may also be a station that supports multi-link sending and receiving.

A service area in which the access point is located may include more than one station. Taking a smart meter wireless system as an example, the access point may be a base station, a routing device, etc. in the smart meter wireless system. The first station may be a smart meter, etc. in the smart meter wireless system. A distance between the first station and the access point is within a coverage range of the access point, so as to ensure that the first station may receive a message frame sent by the access point.

In an example, the first station may be any communication device capable of accessing the access point, including but not limited to: a mobile phone, a smart home device and/or a smart office device.

Step 72 includes receiving an acknowledgement message frame for the first data frame in the first link, the acknowledgement message frame containing time information, and the time information being configured to indicate time at which the first station accesses the first link after receiving the acknowledgement message frame.

In an example, the time information may contain information of starting time, information of ending time, or information of waiting time for the first station to re-access the first link. For example, the time information may indicate that the starting time for the first station to re-access the first link is 10:01:01 to 10:01:02, where the "10:01:01" being the starting time, and the "10:01:02" being the ending time.

In an example, the time information may be information of waiting time for the first station to access the first link after receiving the acknowledgement message frame. For example, the time information may be information of waiting time of 2 ms for the first station to access the first link after receiving the acknowledgement message frame.

In another example, the time information may be information of time at which the first station accesses the first link after receiving the acknowledgement message frame. For example, the time information may be information of time of 10:00:10 at which the first station accesses the first link after receiving the acknowledgement message frame.

In an example, the acknowledgement message frame may be a transmission-type control character sent by the access point to the first station, and may be configured to indicate that the received data has been confirmed to be received or failed to be received. For example, under the condition that the acknowledgement message frame carries acknowledgement (ACK), it is indicated that the access point successfully receives the first message frame; and under the condition that the acknowledgement message frame carries negative acknowledgement (NACK), it is indicated that the access point fails to receive the first message frame.

In an example, after receiving the first data frame sent by the first station each time, the access point feeds back to the first station an acknowledgement message frame indicating whether the first data frame is successfully received.

Step 73 includes accessing the first link according to the time information.

In an example, in response to the waiting time for the first station to access the first link indicated by the time information being zero, the first station directly accesses the first link without waiting after receiving the acknowledgement message frame. In response to the waiting time for the first station to access the first link indicated by the time information being 2 ms, the first station directly accesses the first link after waiting for 2 ms after receiving the acknowledgement message frame. In response to the time at which the first station accesses the first link indicated by the time information being "10:00:01", the first station accesses the first link at 10:00:01.

In an example of the disclosure, since the first data frame is sent in the first link, re-accessing the first link means that the first station re-accesses the first link after sending the first data frame and receiving the acknowledgement message frame. After the first station re-accesses the first link, the first station and the access point may transmit data mutually in the first link.

Figure 8:
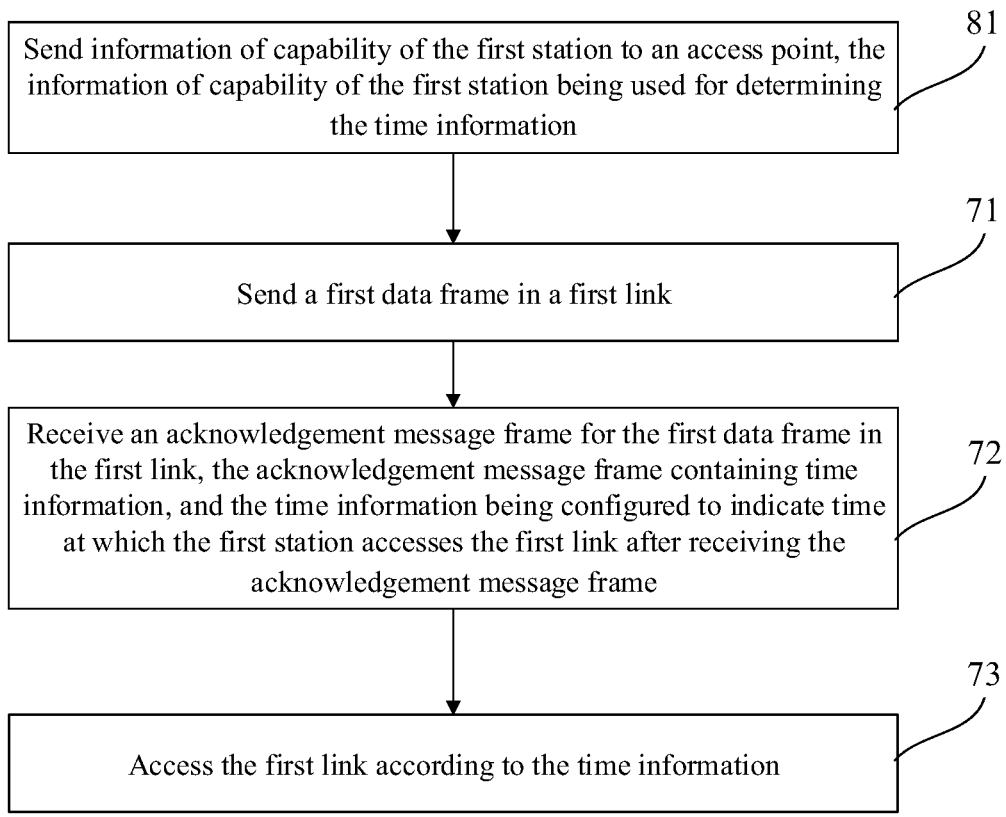
FIG. 8 is a schematic diagram of a method for indicating data transmission under multi-links according to yet another example of the disclosure.

FIG. 8 shows a method for indicating data transmission under multi-links according to another example of the disclosure. With reference to FIG. 8, the method further includes:

Step 81, sending information of capability of the first station to the access point, the information of capability of the first station being used for determining the time information.

The information of capability may be information of capability supporting multi-link simultaneous sending or receiving, may be information of capability supporting multi-link sending or receiving, and may be information of capability supporting single-link sending or receiving.

In an example, the first station may send the information of capability to the access point in the process of establishing connection with the access point. For example, the first station may send, after entering a service range of the access point, the information of capability to the access point in the process of establishing connection with the access point for the first time.

The information of capability is information describing a communication capability of any one of the stations, for example, information describing whether a station supports multi-link receiving and sending or only supports single-link receiving and sending. For another example, under the condition that the information of capability is information describing a station supports multi-link receiving and sending, the information of capability is information describing whether a station only supports multi-link sending or multi-link receiving or simultaneously supports multi-link sending and receiving.

In an example, the step of sending information of capability of the first station to the access point includes sending the information of capability of the first station by means of a probe request frame, an association request frame or an authentication request frame.

In an example, the step of sending information of capability of the first station to the access point includes at least one of the following: sending, in response to the first station supporting multi-link sending and receiving, the information of capability including a first value to the access point; sending, in response to the first station supporting multi-link sending or multi-link receiving, the information of capability including a second value to the access point; and sending, in response to the first station supporting single-link sending or single-link receiving, the information of capability including a third value to the access point.

With reference to FIG. 4b again, the information of capability may be identified by information fields in the probe request frame, the association request frame, the authentication request frame, etc. The information field may include an information element bit field (Element ID), a length bit field (Length) and an information bit field (Information). The information bit field may occupy one byte. The information element bit field may be configured to identify an information of a station identity. For example, the information element bit field includes three bits, with "001" to identify the first station and with "010" to identify the second station. The information bit field may be configured to identify the information of capability of the stations. The station includes the first station.

In an example, the information bit field identifies the information of capability of the stations by means of two bits. For example, in response to the value of the two bits being "00", it is indicated that the station only supports single-link sending or single-link receiving; in response to the value of the two bits being "01", it is indicated that the station supports multi-link sending or multi-link receiving; and in response to the value of the two bits being "10", it is indicated that the station supports multi-link sending and receiving. It should be noted that the number of bits for identifying the information of capability of the stations may be adjusted according to the number of the information of capability contained in a station device. For example, under the condition that more than four types of information of capability are contained in the station device, three bits are required for identification.

Figure 9:
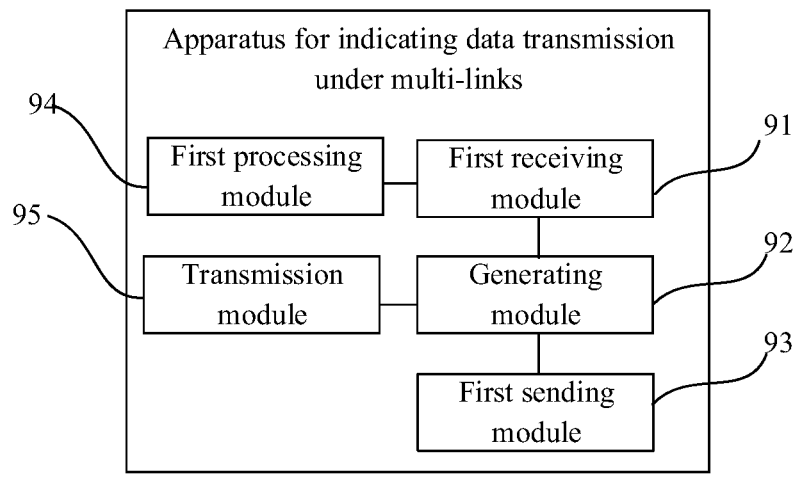
FIG. 9 is a schematic diagram of an apparatus for indicating data transmission under multi-links according to yet another example of the disclosure.

FIG. 9 shows an apparatus for indicating data transmission under multi-links according to yet another example of the disclosure. With reference to FIG. 9, the apparatus includes a first receiving module 91, a generating module 92 and a first sending module 93.

The first receiving module 91 is configured to receive a first data frame sent by a first station in a first link.

The generating module 92 is configured to generate, according to a transmission status of a second data frame between the access point and a second station in a second link, an acknowledgement message frame containing time information for the first data frame, and the time information being configured to indicate time at which the first station re-accesses the first link after receiving the acknowledgement message frame, and the second link being different from the first link.

The first sending module 93 is configured to send the acknowledgement message frame in the first link.

In an example, the generating module 92 is further configured to generate, in response to no second data frame being transmitted between the access point and the second station in the second link, the acknowledgement message frame that contains the time information indicating that waiting time for re-accessing the first link is zero.

In an example, the apparatus further includes a first processing module 94.

The first receiving module 91 is further configured to receive information of capability of the first station and information of capability of the second station;

The first processing module 94 is configured to determine, in response to the second data frame being transmitted between the access point and the second station in the second link, the time information according to the information of capability of the first station and the information of capability of the second station.

In an example, the first processing module 94 is further configured to determine that the time information includes information of waiting time for the first station to access the first link after receiving the acknowledgement message frame.

In an example, the first processing module 94 is further configured to set, in response to the first station supporting multi-link sending and receiving and the second station supporting multi-link sending or multi-link receiving, the waiting time as a frame length for data transmission between the access point and the second station in the second link; and alternatively, set, in response to the first station supporting multi-link sending and receiving and the second station supporting single-link sending or single-link receiving, the waiting time as a frame length for data transmission between the access point and the second station in the second link.

In an example, the first processing module 94 is further configured to set, in response to the first station supporting multi-link sending and receiving and the second station supporting multi-link sending and receiving, the waiting time as zero.

In an example, the first receiving module 91 is further configured to receive the information of capability of the first station and the information of capability of the second station carried in any one of the following message frames: a probe request frame, an association request frame and an authentication request frame.

In an example, the first receiving module 91 is further configured to receive the information of capability that includes one of the following: a first value indicating that a corresponding station supports multi-link sending and receiving, a second value indicating that a corresponding station supports multi-link sending or multi-link receiving, and a third value indicating that a corresponding station supports single-link sending or single-link receiving.

In an example, the apparatus further includes a transmission module 95, the transmission module 95 being configured to receive the second data frame sent by the second station in the second link; and alternatively, send the second data frame to the second station in the second link.

In an example, a basic service set identifier (BSSID) carried in the first data frame is the same as a BSSID carried in the second data frame; and alternatively, a basic service set (BSS) color carried in the first data frame being the same as a BSS color carried in the second data frame.

Figure 10:
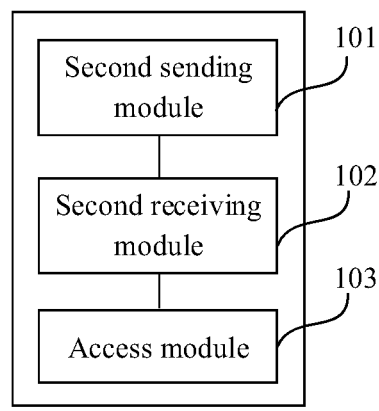
FIG. 10 is a schematic diagram of an apparatus for indicating data transmission under multi-links according to yet another example of the disclosure.

FIG. 10 shows an apparatus for indicating data transmission under multi-links according to yet another example of the disclosure. With reference to FIG. 10, the apparatus includes a second sending module 101, a second receiving module 102 and an access module 103.

The second sending module 101 is configured to send a first data frame in a first link.

The second receiving module 102 is configured to receive an acknowledgement message frame for the first data frame in the first link, the acknowledgement message frame containing time information, and the time information being configured to indicate time at which the first station accesses the first link after receiving the acknowledgement message frame.

The access module 103 is configured to access the first link according to the time information.

In an example, the second sending module 101 is further configured to send information of capability of the first station to an access point, the information of capability of the first station being used for determining the time information.

In an example, the second sending module 101 is further configured to send the information of capability of the first station by means of a probe request frame, an association request frame or an authentication request frame.

In an example, the second sending module 101 is further configured to perform at least one of the following: sending, in response to the first station supporting multi-link sending and receiving, the information of capability including a first value to the access point; sending, in response to the first station supporting multi-link sending or multi-link receiving, the information of capability including a second value to the access point; and sending, in response to the first station supporting single-link sending or single-link receiving, the information of capability including a third value to the access point.

According to an example of the disclosure, there is further provided a communication device, including an antenna, a memory, and a processor. The processor is connected to the antenna and the memory respectively, and is configured to control, by executing an executable program stored in the memory, the antenna to receive and send wireless signals, and configured to execute steps of the method for indicating cached downlink data frame transmission under multi-links or steps of the method for receiving cached downlink data frames under multi-links according to any one of the above examples.

The communication device according to the example may be the above terminal or base station. The terminal may be various person-carried terminals or vehicle-carried terminals. The base station may be a base station of any type, such as a 4G base station or a 5G base station.

The antenna may be an antenna of any type, such as a 3G antenna, a 4G antenna, a 5G antenna or other mobile antennas; and the antenna may further include a Wi-Fi antenna or a wireless charging antenna, etc.

The memory may include various types of storage media, and the storage medium is a non-transitory computer storage medium that may keep memorizing information stored after the communication device is powered off.

The processor may be connected to the antenna and the memory by means of a bus, etc. for reading an executable program stored on the memory, for example, at least one of the methods shown in the examples of the disclosure.

According to an example of the disclosure, there is further provided a non-transitory computer-readable storage medium. The non-transitory computer-readable storage medium stores an executable program, the executable program implementing, when being executed by a processor, steps of the method for indicating cached downlink data frame transmission under multi-links or steps of the method for receiving cached downlink data frames under multi-links according to any one of the above examples, for example, at least one of the methods shown in the examples of the disclosure.

Figure 11:
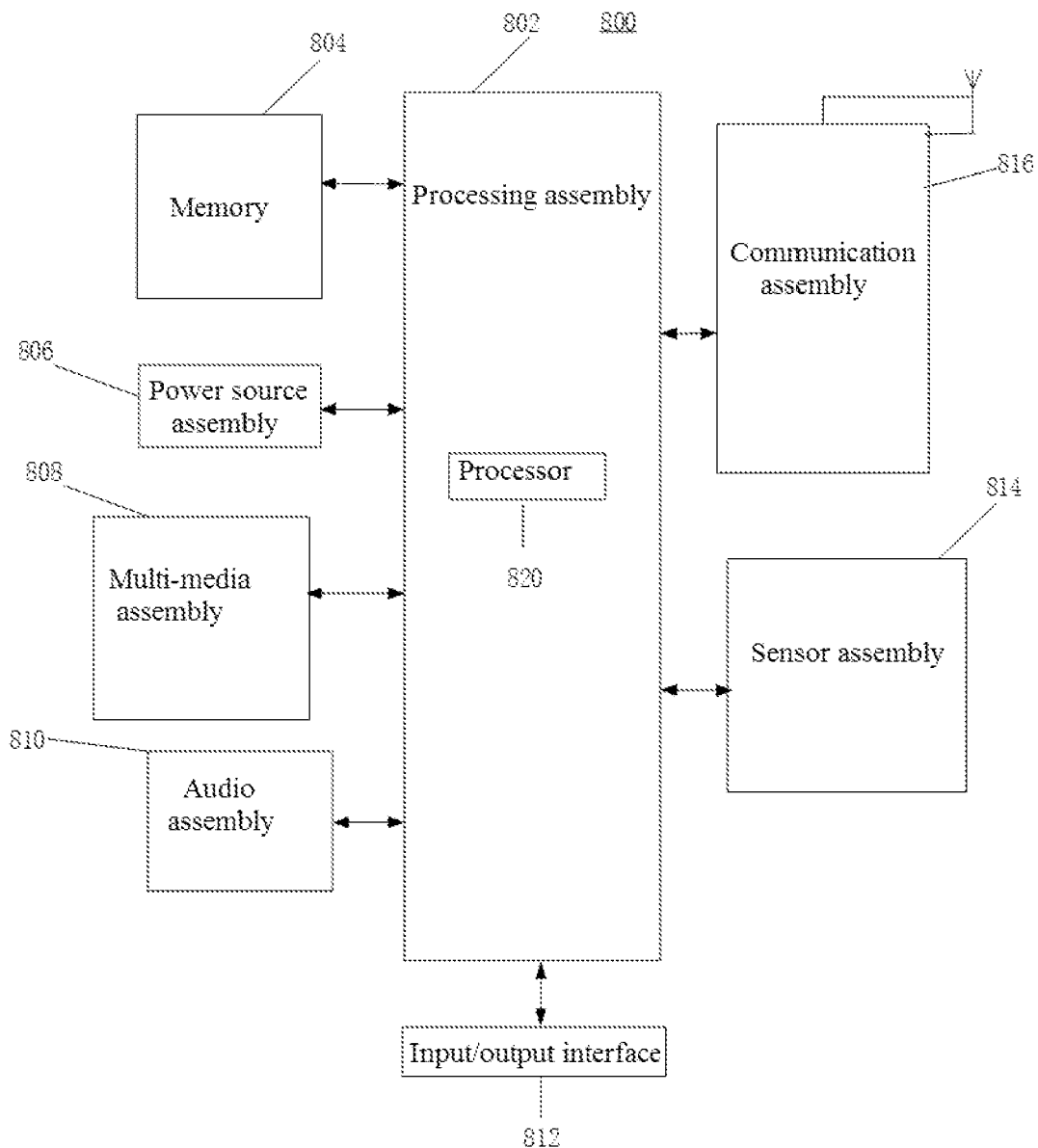
FIG. 11 is a schematic structural diagram of a terminal according to an example of the disclosure.

As shown in FIG. 11, there is provided a terminal according to an example of the disclosure.

With reference to a terminal 800 shown in FIG. 11, there is provided a terminal 800, which may be a mobile phone, a computer, a digital broadcasting terminal, a message receiving and sending device, a game console, a tablet device, a medical device, a fitness device, a personal digital assistant, etc.

With reference to FIG. 11, the terminal 800 may include one or more of the following assemblies: a processing assembly 802, a memory 804, a power source assembly 806, a multi-media assembly 808, an audio assembly 810, an input/output (I/O) interface 812, a sensor assembly 814, and a communication assembly 816.

The processing assembly 802 controls overall operations of the terminal 800, such as operations associated with display, telephone call, data communication, camera operation and recording operation. The processing assembly 802 may include one or more processors 820 to execute instructions, so as to complete all or part of the steps of the above method. Further, the processing assembly 802 may include one or more modules, so as to facilitate interaction between the processing assembly 802 and other assemblies. For example, the processing assembly 802 may include a multi-media module, so as to facilitate interaction between the multi-media assembly 808 and the processing assembly 802.

The memory 804 is configured to store various types of data, so as to support operations at the terminal 800. Examples of such data include instructions for any application or method operating on the terminal 800, contact data, phonebook data, messages, pictures, videos, etc. The memory 804 may be realized by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power source assembly 806 provides power for various assemblies of the terminal 800. The power source assembly 806 may include a power source management system, one or more power sources, and other assemblies associated with generation, management and power distribution of the terminal 800.

The multi-media assembly 808 includes a screen that provides an output interface between the terminal 800 and a user. In some examples, the screen may include a liquid crystal display (LCD) and a touch panel (TP). If the screen includes a touch panel, the screen may be realized as a touch screen, so as to receive an input signal from a user. The touch panel includes one or more touch sensors, so as to sense touches, swipes, and gestures on the touch panel. The touch sensor may sense not only a boundary of a touch or swipe, but also time and pressure associated with the touch or swipe. In some examples, the multi-media assembly 808 includes at least one of a front facing camera and a rear facing camera. When the terminal 800 is in an operating mode, such as a shooting mode or a video mode, the front facing camera and/or the rear facing camera may receive external multi-media data. Each of the front facing camera and the rear facing camera may be a fixed optical lens system or have focusing and optical zooming capabilities.

The audio assembly 810 is configured to output and/or input audio signals. For example, the audio assembly 810 may include a microphone (MIC) that is configured to receive external audio signals when the terminal 800 is in an operating mode, such as a call mode, a recording mode, and a voice recognition mode. The received audio signals may be further stored in the memory 804 or sent by means of the communication assembly 816. In some examples, the audio assembly 810 further includes a loudspeaker for outputting audio signals.

The I/O interface 812 provides an interface between the processing assembly 802 and peripheral interface modules, such as keyboards, click wheels and buttons. These buttons may include, but are not limited to: home buttons, volume buttons, start buttons, and lock buttons.

The sensor assembly 814 may include one or more sensors for providing status assessment of various aspects of the terminal 800. For example, the sensor assembly 814 may detect an on/off state of the terminal 800, and relative positioning of assemblies, for example, a display and keypad of the terminal 800. The sensor assembly 814 may further detect a change in position of the terminal 800 or an assembly of the terminal 800, presence or absence of contact between a user and the terminal 800, orientation or acceleration/deceleration of the terminal 800, and a temperature change of the terminal 800. The sensor assembly 814 may include a proximity sensor configured to detect the presence of a nearby object in the absence of any physical contact. The sensor assembly 814 may further include a light sensor, such as a complementary metal oxide semiconductor (CMOS) or charge coupled device (CCD) image sensor for being used in imaging applications. In some examples, the sensor assembly 814 may further include an acceleration sensor, a gyroscopic sensor, a magnetic sensor, a pressure sensor, or a temperature sensor.

The communication assembly 816 is configured to facilitate wired or wireless communication between the terminal 800 and other devices. The terminal 800 may access a wireless network based on a communication standard, such as Wi-Fi, 2G, 3G, or a combination of Wi-Fi, 2G and 3G. In an example, the communication assembly 816 receives a broadcast signal or broadcast related information from an external broadcast management system by means of a broadcast channel. In an example, the communication assembly 816 further includes a near field communication (NFC) module, so as to facilitate short-range communication. For example, the NFC module may be realized on the basis of a radio frequency identification (RFID) technology, an infrared data association (IrDA) technology, an ultra wideband (UWB) technology, a Bluetooth (BT) technology, and other technologies.

In an example, the terminal 800 may be realized by one or more of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, so as to be configured to execute the above methods.

According to an example, there is further provided a non-transitory computer-readable storage medium including an instruction, such as a memory 804 including an instruction, and the instruction may be executed by the processor 820 of the terminal 800, so as to implement the above method. For example, the non-transitory computer-readable storage medium may be a read-only memory (ROM), a random access memory (RAM), a compact disc read-only memory (CD-ROM), a magnetic tape, a floppy disk, an optical data storage device, etc.

The terminal may be configured to implement the above method, for example, the method shown in any one of the examples of the disclosure.

Figure 12:
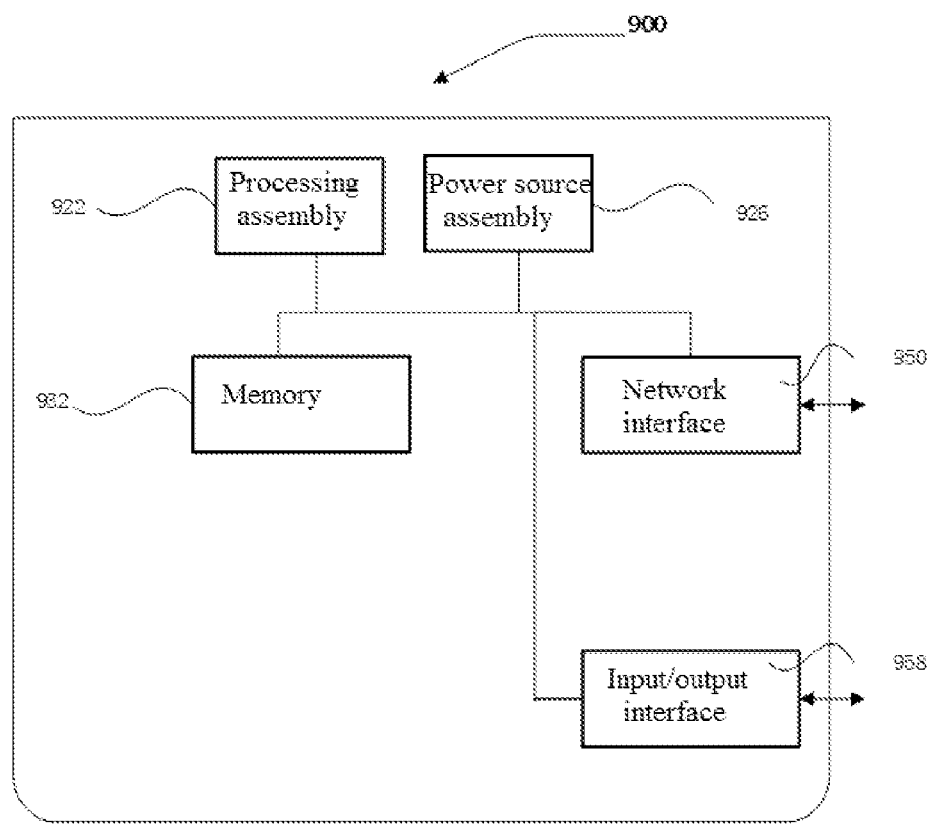
FIG. 12 is a schematic structural diagram of a base station according to an example of the disclosure.

As shown in FIG. 12, there is provided a base station according to an example of the disclosure. For example, the base station 900 may be provided as a network-side device. With reference to FIG. 12, the base station 900 includes a processing assembly 922 which further includes one or more processors, and memory resources represented by the memory 932 for storing an instruction that may be executed by the processing assembly 922, for example, an application. The application stored in the memory 932 may include one or more modules that each correspond to a set of instructions. In addition, the processing assembly 922 is configured to execute an instruction, so as to execute any one of the above methods, for example, the method shown in any one of the examples of the disclosure.

The base station 900 may further include a power source assembly 926 configured to execute power source management of the base station 900, a wired or wireless network interface 950 configured to connect the base station 900 to a network, and an input/output (I/O) interface 958. The base station 900 may operate an operating system stored in the memory 932, such as Windows Server™, Mac OS X™, Unix™, Linux™, FreeBSD™ and similar systems.

The wireless network interface 950 includes, but is not limited to, the antenna of the above communication device. Those skilled in the art could easily conceive of other implementation solutions of the disclosure upon consideration of the description and the invention disclosed in the implementation. The disclosure is intended to cover any variations, uses or adaptive changes of the disclosure, which follow the general principles of the disclosure and include common general knowledge or customary technical means, which is not disclosed in the disclosure, in the art. The description and the examples are to be regarded as exemplary only, and the true scope and spirit of the disclosure are indicated by the following claims.

Additional non-limiting embodiments of the disclosure include:

According to a first aspect of an example of the disclosure, there is provided a method for indicating data transmission under multi-links. The method is performed by an access point and includes:

receiving, in a first link, a first data frame sent by a first station;

generating, according to a transmission status of a second data frame between the access point and a second station in a second link, an acknowledgement message frame containing time information for the first data frame, the time information being configured to indicate time at which the first station re-accesses the first link after the first station receives the acknowledgement message frame, and the second link being different from the first link; and sending the acknowledgement message frame in the first link.

In an example, the step of generating, according to a transmission status of a second data frame between the access point and a second station in a second link, an acknowledgement message frame containing time information for the first data frame includes:
  generating, in response to no second data frame being transmitted between the access point and the second station in the second link, the acknowledgement message frame that contains the time information indicating that waiting time for re-accessing the first link is zero.

In an example, the method further includes:
  receiving information of capability of the first station and information of capability of the second station; and
  determining, in response to the second data frame being transmitted between the access point and the second station in the second link, the time information according to the information of capability of the first station and the information of capability of the second station.

In an example, the time information includes information of waiting time for the first station to access the first link after receiving the acknowledgement message frame.

In an example, the step of determining the time information according to the information of capability of the first station and the information of capability of the second station includes:
  setting, in response to the first station supporting multi-link sending and receiving and the second station supporting multi-link sending or multi-link receiving, the waiting time as a frame length for data transmission between the access point and the second station in the second link; or,
  setting, in response to the first station supporting multi-link sending and receiving and the second station supporting single-link sending or single-link receiving, the waiting time as a frame length for data transmission between the access point and the second station in the second link.

In an example, the step of determining the time information according to the information of capability of the first station and the information of capability of the second station includes setting, in response to the first station supporting multi-link sending and receiving and the second station supporting multi-link sending and receiving, the waiting time as zero.

In an example, the information of capability of the first station and the information of capability of the second station are carried in any one of the following message frames: a probe request frame, an association request frame and an authentication request frame.

In an example, the information of capability includes one of the following:
  a first value indicating that a corresponding station supports multi-link sending and receiving;
  a second value indicating that a corresponding station supports multi-link sending or multi-link receiving; and
  a third value indicating that a corresponding station supports single-link sending or single-link receiving.

In an example, transmission of the second data frame between the access point and the second station in the second link includes at least one of:
  receiving the second data frame sent by the second station in the second link; and
  alternatively,
  sending the second data frame to the second station in the second link.

In an example, a basic service set identifier (BSSID) carried in the first data frame is the same as a BSSID carried in the second data frame; and alternatively, a basic service set (BSS) color carried in the first data frame is the same as a BSS color carried in the second data frame.

According to a second aspect of an example of the disclosure, there is further provided a method for indicating data transmission. The method is performed by a first station and includes:
  sending a first data frame in a first link;
  receiving an acknowledgement message frame for the first data frame in the first link, the acknowledgement message frame containing time information, and the time information being configured to indicate time at which the first station accesses the first link after the first station receives the acknowledgement message frame; and
  accessing the first link according to the time information.

In an example, the method further includes sending information of capability of the first station to an access point, the information of capability of the first station being used for determining the time information.

In an example, the step of sending information of capability of the first station to an access point includes sending the information of capability of the first station by means of a probe request frame, an association request frame or an authentication request frame.

In an example, the step of sending information of capability of the first station to an access point includes at least one of the following:
  sending, in response to the first station supporting multi-link sending and receiving, the information of capability including a first value to the access point;
  sending, in response to the first station supporting multi-link sending or multi-link receiving, the information of capability including a second value to the access point;
  sending, in response to the first station supporting single-link sending or single-link receiving, the information of capability including a third value to the access point.

According to a third aspect of an example of the disclosure, there is further provided an apparatus for indicating data transmission under multi-links. The apparatus is applied to an access point and includes a first receiving module, a generating module and a first sending module.

The first receiving module is configured to receive a first data frame sent by a first station in a first link.

The generating module is configured to generate, according to a transmission status of a second data frame between the access point and a second station in a second link, an acknowledgement message frame containing time information for the first data frame, the time information being configured to indicate time at which the first station re-accesses the first link after receiving the acknowledgement message frame, and the second link being different from the first link.

The first sending module is configured to send the acknowledgement message frame in the first link.

In an example, the generating module is further configured to generate, in response to no second data frame being transmitted between the access point and the second station in the second link, the acknowledgement message frame that contains the time information indicating that waiting time for re-accessing the first link is zero.

In an example, the apparatus further includes a first processing module. The first receiving module is further configured to receive information of capability of the first station and information of capability of the second station. The first processing module is further configured to determine, in response to the second data frame being transmitted between the access point and the second station in the second link, the time information according to the information of capability of the first station and the information of capability of the second station.

In an example, the first processing module is further configured to determine that the time information includes information of waiting time for the first station to access the first link after receiving the acknowledgement message frame.

In an example, the first processing module is further configured to set, in response to the first station supporting multi-link sending and receiving and the second station supporting multi-link sending or multi-link receiving, the waiting time as a frame length for data transmission between the access point and the second station in the second link; and alternatively, set, in response to the first station supporting multi-link sending and receiving and the second station supporting single-link sending or single-link receiving, the waiting time as a frame length for data transmission between the access point and the second station in the second link.

In an example, the first processing module is further configured to set, in response to the first station supporting multi-link sending and receiving and the second station supporting multi-link sending and receiving, the waiting time as zero.

In an example, the first receiving module is further configured to receive the information of capability of the first station and the information of capability of the second station carried in any one of the following message frames: a probe request frame, an association request frame and an authentication request frame.

In an example, the first receiving module is further configured to receive the information of capability that includes one of the following:
 a first value indicating that a corresponding station supports multi-link sending and receiving;
 a second value indicating that a corresponding station supports multi-link sending or multi-link receiving; and
 a third value indicating that a corresponding station supports single-link sending or single-link receiving.

In an example, the apparatus further includes a transmission module, the transmission module being configured to receive the second data frame sent by the second station in the second link; and alternatively, send the second data frame to the second station in the second link.

In an example, a basic service set identifier (BSSID) carried in the first data frame is the same as a BSSID carried in the second data frame; and alternatively, a basic service set (BSS) color carried in the first data frame is the same as a BSS color carried in the second data frame.

According to a fourth aspect of an example of the disclosure, there is further provided an apparatus for indicating data transmission. The apparatus is applied to a first station and includes a second sending module, a second receiving module and an access module.

The second sending module is configured to send a first data frame in a first link.

The second receiving module is configured to receive an acknowledgement message frame for the first data frame in the first link, the acknowledgement message frame containing time information, and the time information being configured to indicate time at which the first station accesses the first link after the first station receives the acknowledgement message frame.

The access module is configured to access the first link according to the time information.

In an example, the second sending module is further configured to send information of capability of the first station to an access point, the information of capability of the first station being used for determining the time information.

In an example, the second sending module is further configured to send the information of capability of the first station by means of a probe request frame, an association request frame or an authentication request frame.

In an example, the second sending module is further configured to perform at least one of the following: sending, in response to the first station supporting multi-link sending and receiving, the information of capability including a first value to the access point; sending, in response to the first station supporting multi-link sending or multi-link receiving, the information of capability including a second value to the access point; and sending, in response to the first station supporting single-link sending or single-link receiving, the information of capability including a third value to the access point.

According to a fifth aspect of an example of the disclosure, there is provided a communication device, including an antenna, a memory, and a processor. The processor is connected to the antenna and the memory respectively, and the processor is configured to control, by executing an executable program stored in the memory, the antenna to receive and send wireless signals, and configured to execute the steps of the method according to any one of the above technical solutions.

According to a sixth aspect of an example of the disclosure, there is provided a non-transitory computer-readable storage medium. The non-transitory computer-readable storage medium stores an executable program, the executable program implementing the steps of the method according to any one of the above technical solutions when being executed by a processor.

In the examples of the disclosure, the first data frame sent by the first station is received in the first link; according to the transmission status of the second data frame between the access point and the second station in the second link, the acknowledgement message frame for the first data frame that contains the time information is generated, and the time information being configured to indicate the time at which the first station re-accesses the first link after the first station receives the acknowledgement message frame, and the second link being different from the first link; and the acknowledgement message frame is sent in the first link. In this way, the acknowledgement message frame for the first data frame contains the time information, and the first station may re-access the first link after receiving the acknowledgement message frame according to an indication of the time information. Since the time information is generated according to the transmission status of the second data frame between the access point and the second station in the second link, the transmission status of the second data frame in the second link is reflected. Compared with accessing the first link randomly, the first station accesses the first link based on the time information, so that interference to transmission of the second data frame between the access point and the second station in the second link may be reduced.

It should be understood that the disclosure is not limited to a precise structure which has been described above and illustrated in the accompanying drawings, and may have various modifications and changes without departing from its scope. The scope of the disclosure is limited by the appended claims.

What is claimed is:

1. A method for indicating data transmission under multi-links, performed by an access point and comprising:
   receiving, in a first link, a first data frame sent by a first station;
   generating, according to a transmission status of a second data frame between the access point and a second station in a second link, an acknowledgement message frame containing time information for the first data frame, the time information being configured to indicate time at which the first station re-accesses the first link after receiving the acknowledgement message frame, and the second link being different from the first link; and
   sending the acknowledgement message frame in the first link;
   wherein the method further comprises:
   receiving information of capability of the first station and information of capability of the second station; and
   determining, in response to the second data frame being transmitted between the access point and the second station in the second link, the time information according to the information of capability of the first station and the information of capability of the second station.

2. The method according to claim 1, wherein generating, according to the transmission status of the second data frame between the access point and the second station in the second link, the acknowledgement message frame containing the time information for the first data frame comprises:
   generating, in response to no second data frame being transmitted between the access point and the second station in the second link, the acknowledgement message frame that contains the time information indicating that waiting time for re-accessing the first link is zero.

3. The method according to claim 1, wherein the time information comprises:
   information of waiting time for the first station to access the first link after receiving the acknowledgement message frame.

4. The method according to claim 3, wherein determining the time information according to the information of capability of the first station and the information of capability of the second station comprises at least one of:
   setting, in response to the first station supporting multi-link sending and receiving and the second station supporting multi-link sending or multi-link receiving, the waiting time as a frame length for data transmission between the access point and the second station in the second link; or
   setting, in response to the first station supporting multi-link sending and receiving and the second station supporting single-link sending or single-link receiving, the waiting time as a frame length for data transmission between the access point and the second station in the second link.

5. The method according to claim 3, wherein determining the time information according to the information of capability of the first station and the information of capability of the second station comprises:
   setting, in response to the first station supporting multi-link sending and receiving and the second station supporting multi-link sending and receiving, the waiting time as zero.

6. The method according to claim 1, wherein the information of capability of the first station and the information of capability of the second station are carried in any one of the following message frames:
   a probe request frame, an association request frame and an authentication request frame.

7. The method according to claim 1, wherein the information of capability comprises one of:
   a first value indicating that a corresponding station supports multi-link sending and receiving;
   a second value indicating that a corresponding station supports multi-link sending or multi-link receiving; or
   a third value indicating that a corresponding station supports single-link sending or single-link receiving.

8. The method according to claim 1, wherein
   transmission of the second data frame between the access point and the second station in the second link comprises at least one of:
   receiving the second data frame sent by the second station in the second link; and
   sending the second data frame to the second station in the second link connection.

9. The method according to claim 1, wherein a basic service set identifier (BSSID) carried in the first data frame is the same as a BSSID carried in the second data frame; or, a basic service set (BSS) color carried in the first data frame is the same as a BSS color carried in the second data frame.

10. A non-transitory computer storage medium storing a computer-executable instruction, the computer-executable instruction being capable of implementing the method according to claim 1 when being collectively executed by one or more processors.

11. A method for indicating data transmission under multi-links, performed by a first station and comprising:
    sending a first data frame in a first link;
    receiving an acknowledgement message frame for the first data frame in the first link, the acknowledgement message frame containing time information, and the time information being configured to indicate time at which the first station accesses the first link after receiving the acknowledgement message frame; and
    accessing the first link according to the time information;
    wherein the method further comprises:
    sending information of capability of the first station to an access point, the information of capability of the first station being used for determining the time information.

12. The method according to claim 11, wherein sending the information of capability of the first station to the access point comprises:
    sending the information of capability of the first station by means of a probe request frame, an association request frame or an authentication request frame.

13. The method according to claim 11, wherein
    sending the information of capability of the first station to the access point comprises at least one of:
    sending, in response to the first station supporting multi-link sending and receiving, the information of capability comprising a first value to the access point;
    sending, in response to the first station supporting multi-link sending or multi-link receiving, the information of capability comprising a second value to the access point; or
    sending, in response to the first station supporting single-link sending or single-link receiving, the information of capability comprising a third value to the access point.

14. A communication device, comprising:

an antenna;

a memory; and one or more processors, the one or more processors are collectively connected to the antenna and the memory respectively, and are collectively configured to control the antenna to receive and send by executing a computer-executable instruction stored in the memory, and are further collectively configured to implement the method according to claim 11.

15. A non-transitory computer storage medium storing a computer-executable instruction, the computer-executable instruction being capable of implementing the method according to claim 11 when being collectively executed by one or more processors.

16. A communication device, comprising:

an antenna;

a memory; and one or more processors, the one or more processors are connected to the antenna and the memory respectively, and are collectively configured to control the antenna to receive and send by executing a computer-executable instruction stored in the memory, and are further collectively configured to:

receive, in a first link, a first data frame sent by a first station;

generate, according to a transmission status of a second data frame between an access point and a second station in a second link, an acknowledgement message frame containing time information for the first data frame, the time information being configured to indicate time at which the first station re-accesses the first link after receiving the acknowledgement message frame, and the second link being different from the first link; and send the acknowledgement message frame in the first link;

wherein the one or more processors are further collectively configured to:

receive information of capability of the first station and information of capability of the second station; and determine, in response to the second data frame being transmitted between the access point and the second station in the second link, the time information according to the information of capability of the first station and the information of capability of the second station.

17. The communication device according to claim 16, wherein the one or more processors are further collectively configured to:

generate, in response to no second data frame being transmitted between the access point and the second station in the second link, the acknowledgement message frame that contains the time information indicating that waiting time for re-accessing the first link is zero.

\* \* \* \* \*

UNITED STATES PATENT AND TRADEMARK OFFICE
CERTIFICATE OF CORRECTION

PATENT NO. : 12,414,175 B2  
APPLICATION NO. : 17/791671  
DATED : September 9, 2025  
INVENTOR(S) : Wei Hong Page 1 of 1

It is certified that error appears in the above-identified patent and that said Letters Patent is hereby corrected as shown below:

In the Claims

In Column 22, Line 21, in Claim 8, delete "link connection." and insert -- link. --, therefor.

Signed and Sealed this  
Thirtieth Day of December, 2025

John A. Squires  
*Director of the United States Patent and Trademark Office*